(12) United States Patent
Li

(10) Patent No.: US 7,441,961 B2
(45) Date of Patent: Oct. 28, 2008

(54) SEAL DEVICE FOR BICYCLE STEERING BEARING ASSEMBLY

(76) Inventor: Kun-Yuan Li, 5F-2, No. 181, Sec. 2, Mei Tsun Rd., Taichung City (TW)

( * ) Notice: Subject to any disclaimer, the term of this patent is extended or adjusted under 35 U.S.C. 154(b) by 315 days.

(21) Appl. No.: 11/492,025

(22) Filed: Jul. 25, 2006

(65) Prior Publication Data

US 2008/0025659 A1    Jan. 31, 2008

(51) Int. Cl.
*F16C 33/78* (2006.01)
*B62K 21/06* (2006.01)
(52) U.S. Cl. .................. 384/545; 384/477; 280/279
(58) Field of Classification Search ........... 384/477, 384/545, 540; 74/551.1; 280/279, 280
See application file for complete search history.

(56) References Cited

U.S. PATENT DOCUMENTS 4,466,629 A  *  8/1984  Sinyard  ..................... 280/279
5,681,119 A  *  10/1997  Marui  ....................... 384/545
6,231,063 B1 *  5/2001  Chi  ........................... 280/279
6,651,525 B2 *  11/2003  Jiang  ........................ 74/551.1
6,682,088 B1 *  1/2004  Lin  ........................... 384/545
6,729,634 B2 *  5/2004  Tange  ....................... 280/279

* cited by examiner

Primary Examiner—Thomas R Hannon

(57) ABSTRACT

A seal device for a bicycle steering bearing assembly includes a seal ring having a tubular insertion and a flange extends radially horizontally from one end of the insertion. A tapered mask has a first open end which is engaged with a groove in an outer periphery of the insertion and a second open end of the mask receives the steering bearing assembly therein. A locking nut is securely mounted to the steerer tube and has another groove defined in an inner periphery of one end thereof. The other end of the insertion is engaged with the groove of the locking nut.

6 Claims, 3 Drawing Sheets

SEAL DEVICE FOR BICYCLE STEERING BEARING ASSEMBLY

FIELD OF THE INVENTION

The present invention relates to a seal device for bicycle steering bearing assembly and the seal device includes less number of parts and is easily assembled to the bearing assembly.

BACKGROUND OF THE INVENTION

A conventional bicycle steering bearing assembly is connected to two ends of the head tube of a bicycle frame and the steerer tube extends through the head tube and is cooperated with the two bearing assemblies so that the steering tube can be freely rotated relative to the head tube. There are several small parts involved in the conventional steering bearing assembly and the conventional seal device is connected to the steering bearing assembly to prevent dust and water from entering the steering bearing assembly. However, the conventional seal device includes several pieces which include at least two grooves defined in an outer periphery of the cover so as to receive two seal rings therein. Although the seal rings successfully seal the dust and water, it is noted that the grooves are so tiny so that special tool and skill are needed to manufacture the grooves in a small part. Besides, it takes a lot of time to assemble the conventional seal device to the steering bearing assembly.

The present invention intends to provide a seal device for a bicycle steering bearing assembly and the seal device is effective, includes less number of parts, and is easily assembled to the bearing assembly.

SUMMARY OF THE INVENTION

The present invention relates to a seal device for a bicycle steering bearing assembly and comprises a seal ring having a tubular insertion and a flange extends radially horizontally from one end of the insertion. A mask has a first open end engaged with an outer periphery of the insertion and a second open end of the mask within which the steering bearing assembly is received. A locking nut is securely mounted to a steerer tube and has a groove defined in an inner periphery of one end thereof. The other end of the insertion is engaged with the groove.

The primary object of the present invention is to provide a seal device for a bicycle steering bearing device and the seal device effectively prevents dust and water from entering the steering bearing assembly.

The other object of the present invention is to provide a seal device for a bicycle steering bearing device and the seal device includes three parts which are easily assembled.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
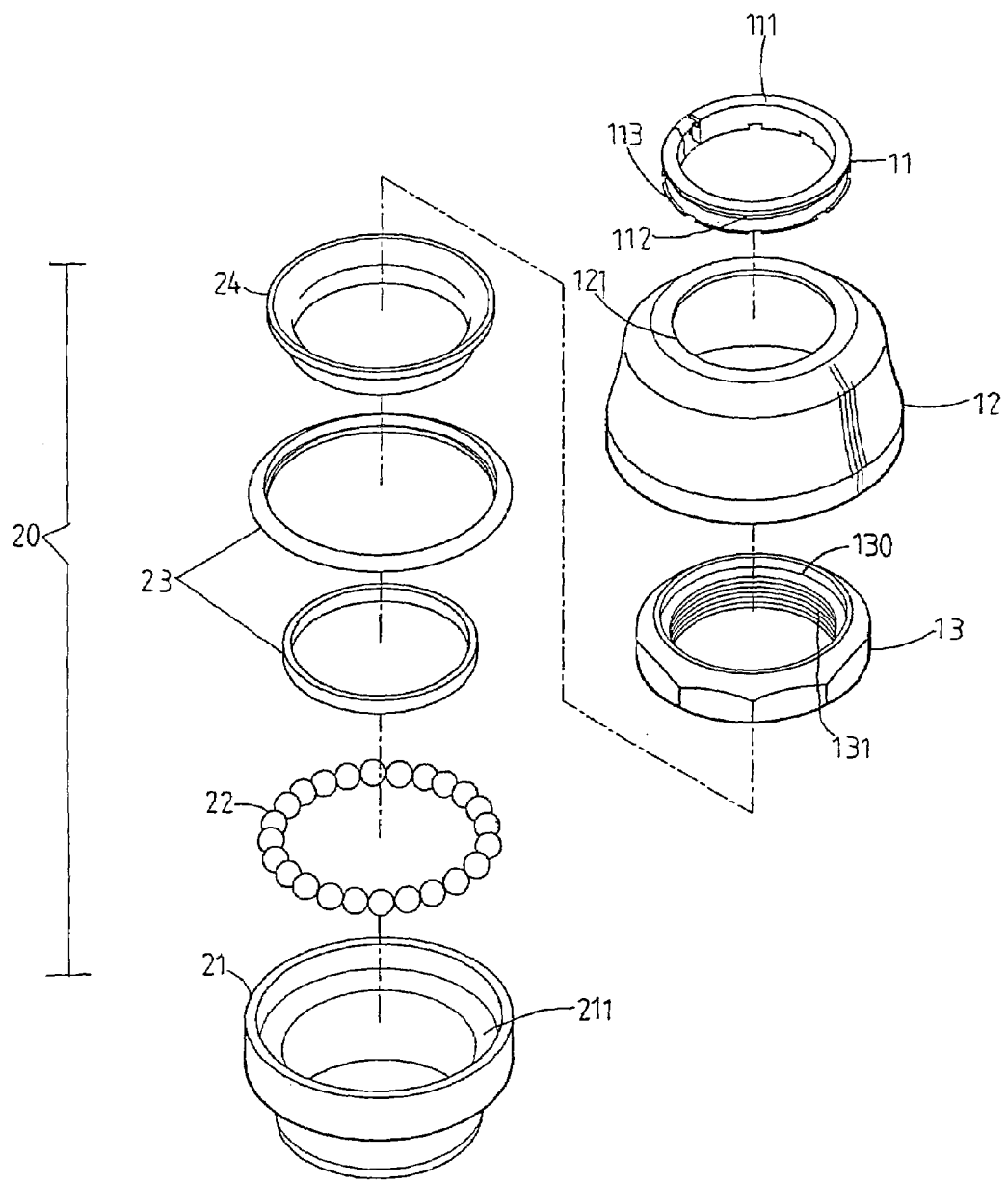
FIG. 1 is an exploded view to show the steering bearing device and the seal device of the present invention.
Figure 2:
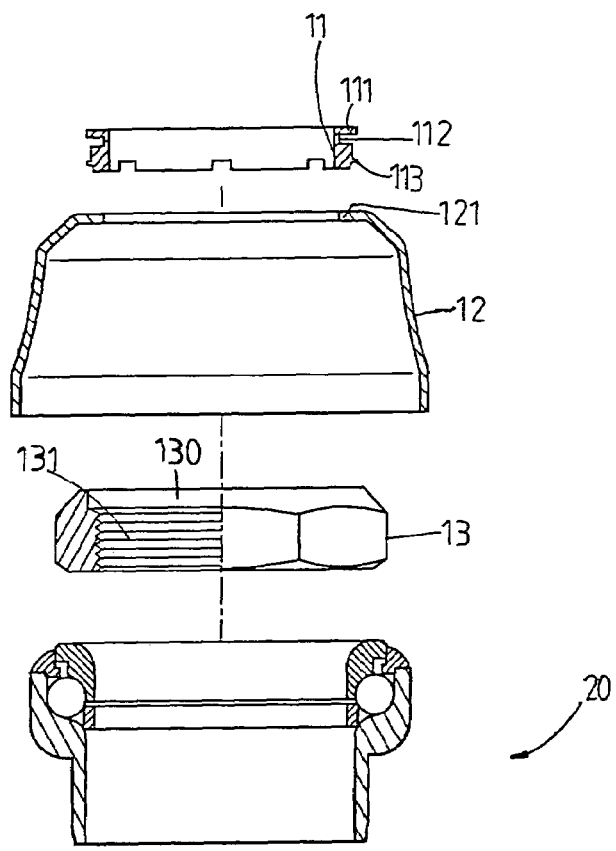
FIG. 2 is a cross sectional view to show the three parts of the seal device of the present invention.
Figure 3:
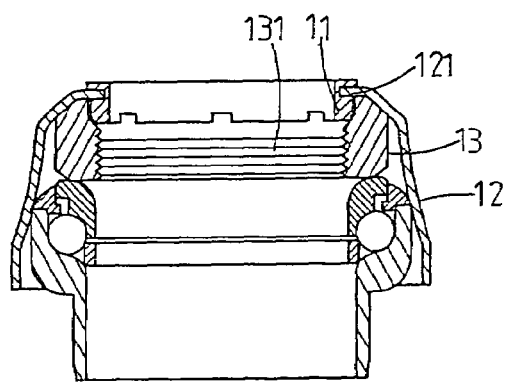
FIG. 3 is a cross sectional view to show that the seal device is connected to the steering bearing assembly.

Referring to FIGS. 1 to 4, the seal device of the present invention is used to be connected with a bicycle steering bearing assembly 20 so as to prevent dust and water from entering the bicycle steering bearing assembly 20. The bicycle steering bearing assembly 20 is connected to each one of two ends of the head tube 32 of the bicycle and comprises a brace 21 having a first groove 211 defined in an inner periphery of one end thereof and a plurality of beads 22 are received in the first groove 211 and positioned by two positioning rings 23. A setting ring 24 has a second groove defined in an outer periphery thereof and the beads 22 are positioned between the first groove 211 and the second groove. The bicycle steering bearing assembly 20 is well known to the skilled persons.

The seal device of the present invention includes a seal ring 11 that has a tubular insertion and a flange 111 extends radially horizontally from one end of the insertion. A positioning rib 113 extends radially outward from the outer periphery of the other end of the insertion.

A tapered mask 12 has a first open end and a second open end. The first open end is smaller than the second open end. The insertion includes an engaging groove 112 defined in the outer periphery thereof and an inner periphery 121 of the first open end of the mask 12 is engaged with the engaging groove 112. The flange 111 of the seal ring 11 is rested on the inner periphery 121 of the first open end of the mask 12. The steering bearing assembly 20 is received in the second open end of the mask 12.

Figure 4:
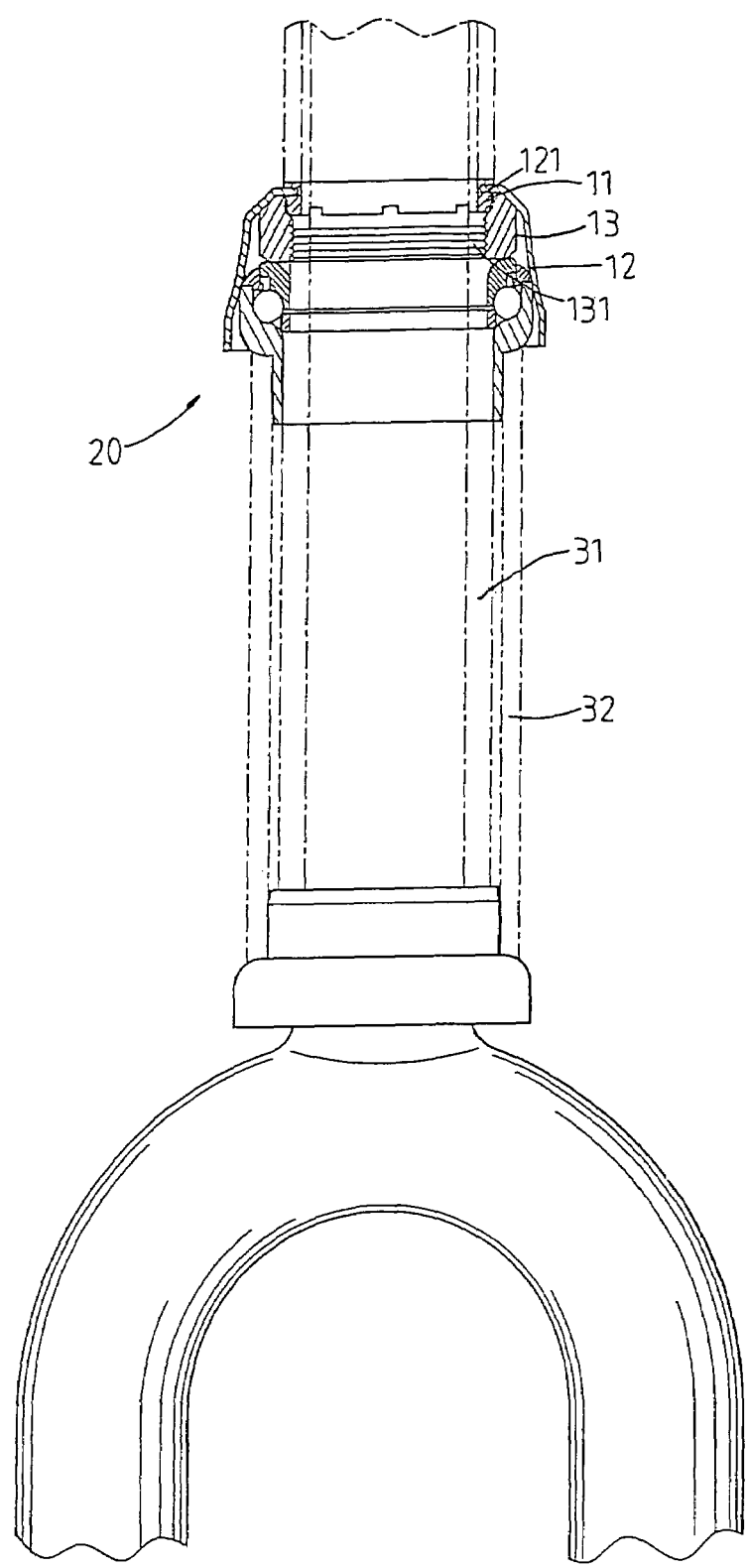
FIG. 4 shows that the steering bearing assembly is connected to the head tube and the seal device is connected to the steering bearing assembly, the steerer tube extends through the head tube and the seal device.

A locking nut 13 has a threaded inner periphery 131 so that the threaded inner periphery 131 is threadedly connected to the steerer tube 31. The locking nut 13 may have a knurled inner periphery to securely be mounted to the steerer tube 31. In this embodiment as shown in FIG. 4, the steerer tube 31 includes at least two sections with different outer diameters so as to be snugly engaged with the seal ring 11 and the locking nut 13. A third groove 130 is defined in an inner periphery of one end of the locking nut 13 so that the other end of the insertion engaged with the third groove 130. Specifically, the positioning rib 113 is engaged with the third groove 130 of the locking nut 13.

By the engagement of the inner periphery 121 of the first open end of the mask 12 and the engaging groove 112 of the seal ring 11, foreign objects cannot enter the steering bearing assembly 20. The seal ring 11 can be easily made by way of plastic injection so that no tiny grooves have to be manufactured on small part.

While we have shown and described the embodiment in accordance with the present invention, it should be clear to those skilled in the art that further embodiments may be made without departing from the scope of the present invention.

What is claimed is:

1. A seal device for a bicycle steering bearing assembly which includes a brace having a first groove defined in an inner periphery of one end thereof and a plurality of beads are received in the first groove and positioned by a positioning ring, a setting ring has a second groove defined in an outer periphery thereof and the beads are positioned between the first and second grooves, the seal device comprising:

a seal ring having a tubular insertion and a flange extending radially horizontally from one end of the insertion;

a mask having a first open end engaged with an outer periphery of the insertion and a second open end of the mask adapted to receive the steering bearing assembly therein, and a locking nut adapted to be securely mounted to a steerer tube and having a third groove defined in an inner periphery of one end thereof, the other end of the insertion engaged with the third groove.

2. The seal device as claimed in claim 1, wherein the insertion includes an engaging groove defined in the outer periphery thereof and the an inner periphery of the first open end of the mask is engaged with the engaging groove.

3. The seal device as claimed in claim 2, wherein the flange of the seal ring is rested on the inner periphery of the first open end of the mask.

4. The seal device as claimed in claim 1, wherein a positioning rib extends radially outward from the outer periphery of the other end of the insertion and is engaged with the third groove of the locking nut.

5. The seal device as claimed in claim 1, wherein the mask is a tapered mask and the first open end is smaller than the second open end.

6. The seal device as claimed in claim 1, wherein the locking nut has a threaded inner periphery.

* * * * *